(12) United States Patent
Ip et al.

(10) Patent No.: US 7,734,831 B2
(45) Date of Patent: Jun. 8, 2010

(54) UNIVERSAL REMOTE CONTROL DEVICE FOR CONTROLLING ENTERTAINMENT-RELATED FUNCTIONS

(75) Inventors: Michael C. Ip, Fremont, CA (US);
Yancy T. Chen, Campbell, CA (US);
John P. Romano, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 445 days.

(21) Appl. No.: 10/884,754

(22) Filed: Jul. 2, 2004

(65) Prior Publication Data

US 2006/0004937 A1   Jan. 5, 2006

(51) Int. Cl.
*G06F 3/00* (2006.01)
*G06F 13/12* (2006.01)

(52) U.S. Cl. .................... 710/5; 710/62; 710/64
(58) Field of Classification Search .......... 710/5, 710/62, 64
See application file for complete search history.

(56) References Cited

U.S. PATENT DOCUMENTS

| | | | |
|---|---|---|---|
| 6,169,879 B1* | 1/2001 | Perlman | 725/119 |
| 2002/0129289 A1 | 9/2002 | Sato | |
| 2002/0194596 A1* | 12/2002 | Srivastava | 725/37 |
| 2003/0193519 A1* | 10/2003 | Hayes et al. | 345/721 |
| 2003/0195969 A1* | 10/2003 | Neuman | 709/229 |
| 2005/0055545 A1* | 3/2005 | Guo et al. | 713/1 |
| 2005/0146497 A1* | 7/2005 | Clapper | 345/156 |
| 2006/0007933 A1* | 1/2006 | Maxson et al. | 370/392 |

FOREIGN PATENT DOCUMENTS

| | | |
|---|---|---|
| JP | 2002101476 | 4/2002 |
| WO | WO03/067543 | 8/2003 |

OTHER PUBLICATIONS

Firefly Remote Control Help, 2003, http://www.snapstream.com/download/pdf/firefly.pdf, Snapstream Media.*
USB-UIRT, 2003, http://web.archive.org/web/20040405220815/www.usbuirt.com, John Rhees.*

* cited by examiner

*Primary Examiner*—Alford W Kindred
*Assistant Examiner*—David E Martinez

(57) ABSTRACT

In an embodiment of the invention, an apparatus for a universal remote control system for controlling entertainment-related functions, includes: a remote control device configured to transmit a control signal with a command; a computer configured to translate the command into a modified command and to transmit the modified command in a modified control signal; and an electronic device configured to perform a device function, in response to the modified command. In another embodiment of the invention, a method for a universal remote control system for controlling entertainment-related functions, includes: transmitting a control signal with a command from a remote control device; translating, by a computer, the command into a modified command and transmitting, by the computer, the modified command in a modified control signal to an electronic device; and performing a device function by the electronic device, in response to the modified command.

8 Claims, 5 Drawing Sheets

| Remote Control Device 110A | | | | | | |
|---|---|---|---|---|---|---|
| E 205 | C 210 | Play DVD 215 | DVD On/Off 220 | Stop DVD 225 | DVD Record 230 | DVD Pause 235 |
| TV On/Off 237 | TV Channel 239 | Play VCR 241 | VCR On/Off 242 | Stop VCR 244 | VCR Record 246 | VCR Pause 248 |
| Music On/Off 250 | Music Channel 252 | Play CD 254 | CD On/Off 256 | Stop CD 258 | CD Record 260 | CD Pause 262 |
| PC Music 264 | Music Channel 266 | Play PC CD 267 | PC CD On/Off 268 | Stop PC CD 270 | Other 272 | Other 274 |

UNIVERSAL REMOTE CONTROL DEVICE FOR CONTROLLING ENTERTAINMENT-RELATED FUNCTIONS

TECHNICAL FIELD

Embodiments of the invention relate generally to computer systems. More particularly, embodiments of the invention relate to a universal remote control device for controlling entertainment-related functions. The entertainment-related functions can be performed, for example, by a computer or/and by a consumer electronic device that can communicate with the computer.

BACKGROUND

There is currently no available single remote control device for controlling the computer functions and non-computer functions (e.g., entertainment functions such as DVD (digital video disk) playback, compact disk operations, and game functions) in an integrated product such as a computer that is configured to provide home entertainment functions. One example of such an integrated product is a personal computer that can provide home entertainment functions.

As these integrated products with computer functionality and home entertainment functionality become more prevalent, it is important that the consumer is not subjected to a complicated and confusing experience in controlling these integrated products. The consumer would typically expect that these integrated products are as easy to operate and control as the current conventional consumer electronic devices with home entertainment functions.

To operate any conventional remote control device, typically a button or a key is depressed by the consumer. A depressed key or button translates into a control signal (e.g. an infrared light signal or radio frequency signal or other types of control signals) that is received by a remote host device, such as a television or a computer. A remote control device for a computer is not able to control the operations of a consumer electronic devices, such as televisions, radio/stereo devices, compact disk (CD) players, digital video disc (DVD) disk players, video cassette recorders (VCR), set-top boxes, and/or other types of consumer electronic devices. Similarly, a remote control device for a consumer electronic device is not able to control a computer. Currently, it is typical for the consumer to accumulate three or more remote control devices in order to operate and control an integrated product such as a computer with home entertainment functions. This multiple number of remote control devices is an inconvenience for the consumer.

Therefore, the current technology is limited in its capabilities and suffers from at least the above constraints and deficiencies.

SUMMARY OF EMBODIMENTS OF THE INVENTION

In accordance with an embodiment of the invention, an apparatus for a universal remote control system for controlling entertainment-related functions, includes:

a remote control device configured to transmit a control signal with a command;

a computer configured to translate the command into a modified command and to transmit the modified command in a modified control signal; and an electronic device configured to perform a device function, in response to the modified command.

In another embodiment of the invention, a method for a universal remote control system for controlling entertainment-related functions, includes:

transmitting a control signal with a command from a remote control device;

translating, by a computer, the command into a modified command and transmitting, by the computer, the modified command in a modified control signal to an electronic device; and performing a device function by the electronic device, in response to the modified command.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a block diagram of an example remote control device that can be used in an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
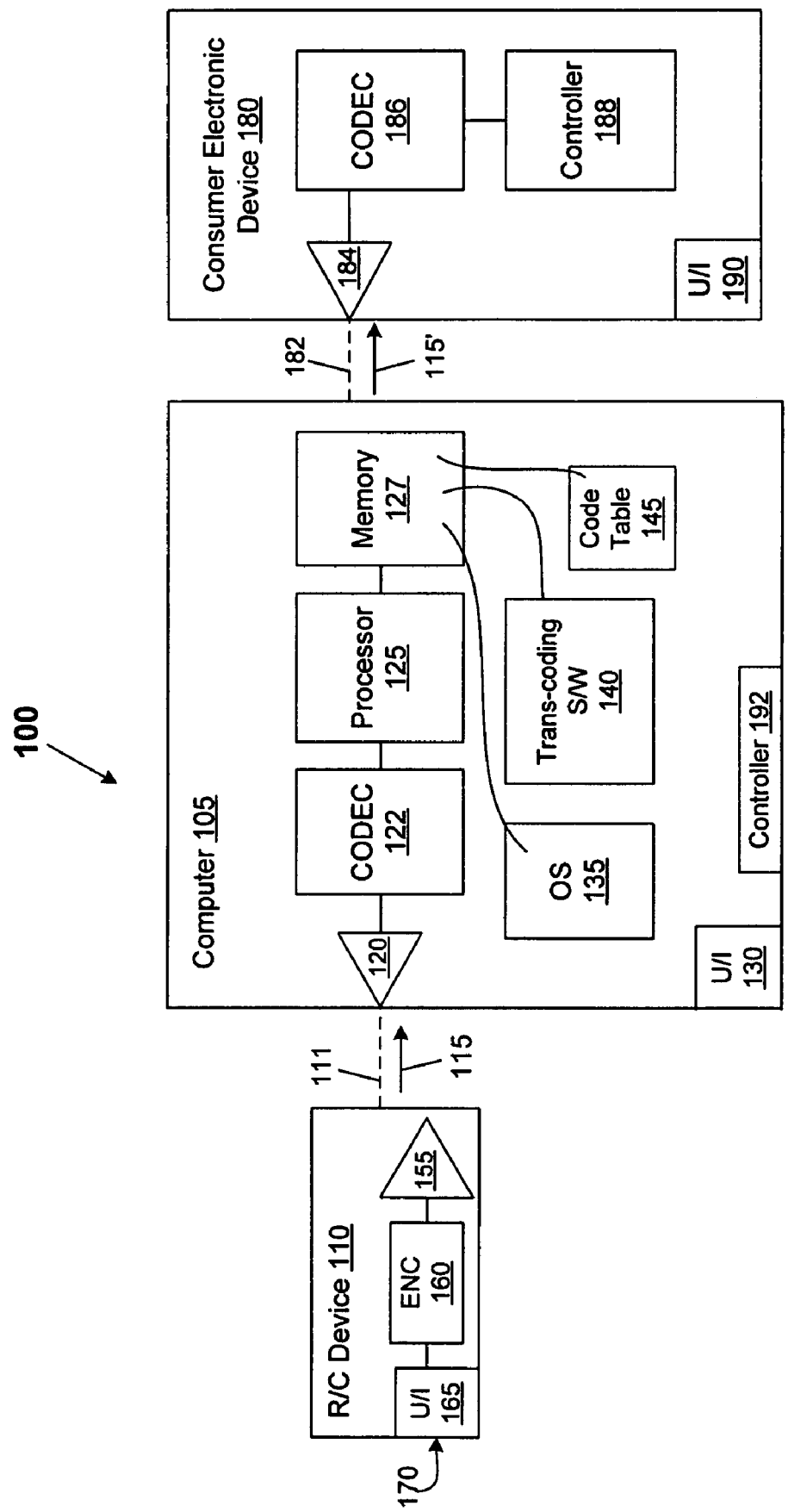
FIG. 1 is a block diagram of an apparatus in accordance with an embodiment of the invention.

FIG. 1 is a block diagram of an apparatus 100 in accordance with an embodiment of the invention. The apparatus 100 typically includes a computer 105, and a remote control device 110 that can communicate with the computer 105 by use of control signals (generally, control signals 115). Two specific examples of the remote control device 110 are the device 110A in FIG. 2 and the device 110B in FIG. 3. Specific examples of the control signals 115 are shown in FIG. 4. It is understood that for purposes of explaining functionalities of embodiments of the invention, the elements in the drawings are not necessarily drawn to scale. The remote control device 110 and computer 105 can communicate with each other via communication path 111. Typically, the communication path 111 is wireless, where the wireless transmission of control signals 115 can occur from the remote control device 110 to the computer 105.

It is also within the scope of embodiments of the invention for the remote control device 110 and the computer 105 to be connected by a communication path 111 which may be, for example, a wired connection, bus connection, a portion of a network connection, and/or other types of suitable communication links.

The computer 105 may be, for example, a personal computer, notebook, laptop, palmtop, handheld processing device, server, workstation, and/or another type of computing device. In one embodiment of the invention, the computer 105 is a home entertainment computer that is configured to provide home entertainment functions and/or multi-media functions such as audio, picture, and/or video outputs, as well as provide standard computing functions.

Typically, the computer 105 includes a transceiver 120 (or a transmitter and receiver), an encoder and decoder (CODEC) block 122, a processor 125, and a memory 127. The computer 105 may also include a user interface 130 that typically includes a display screen and input/output devices such as, for example, keyboards and a cursor control device such as a mouse. The memory 127 can store software or firmware such as, for example, an operating system (OS) program 135, a transcoding software 140, and a code table 145. An embodiment of the transcoding software 140 and code table 145 are discussed further below. The transcoding software 140 translates or modifies the control signals 115 into modified control signals 115', as described further below.

The decoder/encoder (CODEC) block 122 can decode signals received by the transceiver 120 and encode signals transmitted by the transceiver 120.

The processor 125 may be embodied as, for example, a micro-controller, microprocessor, digital signal processor (DSP), Application Specific Integrated Circuit (ASIC), programmable logic device (PLD), field programmable gate array (FPGA), or other suitable devices.

For purposes of describing embodiments of the invention, other known elements in the computer 105 have been omitted in FIG. 1.

In an embodiment, the remote control device 110 includes a transceiver 155 (or transmitter) for transmitting the control signals 115, an encoder (or CODEC) 160 for processing and encoding the control signals 115 prior to the transmission by the transceiver 155, and a user interface 165 for receiving the user inputs 170.

The transmitter 155 transmit the control signals 115, for example, as infrared (I/R) signals, radio frequency (RF) signals, optical signals, or other types of suitable wireless signals if the communication path 111 is a wireless link. The control signals 115 can be at other frequencies of the electromagnetic spectrum such as, for example, Ultrahigh Frequency (UHF), Very High Frequency (VHF), microwave, and/or other frequencies.

For purposes of describing embodiments of the invention, other known elements in the remote control device 105 have been omitted in FIG. 1.

In an embodiment of the invention, the computer 105 may communicate with a consumer electronic device 180 which may be, for example, a television, radio or stereo device, compact disk (CD) player, digital video disc (DVD) disk player, video cassette recorders (VCR), set-top box, an electronic device that can perform a combination of functions of the above consumer electronic devices, or another suitable type of electronic device. It is noted that the consumer electronic device 180 is not necessarily an electronic device 180 that is sold or used by a consumer. The consumer electronic device 180 may be any suitable electronic device that provides an entertainment-related functionality such as, for example, video output, audio output, optical output, picture output, and/or other outputs.

The computer 105 and consumer electronic device 180 can communicate with each other via communication path 182. Typically, the communication path 182 is wireless, where the wireless transmission of modified control signals 115' can occur from the computer 105 to the consumer electronic device 180. It is also within the scope of embodiments of the invention for the computer 105 and the consumer electronic device 180 to be connected by a communication path 182 which may be, for example, a wired connection, bus connection, a portion of a network connection, and/or other types of suitable communication links.

Typically, the consumer electronic device 180 includes a transceiver 184 (or a transmitter and receiver), a CODEC block 186 (or decoder block only), and a controller 188. The consumer electronic device 180 may also include a user interface 190 that may include, for example, speakers for generating audio output, a display screen (e.g., a liquid crystal display screen and/or a cathode ray tube) for generating video output and/or picture output, and/or control buttons or switches or other types of actuators for receiving input from the user.

In other embodiments, block 184 may be implemented as a receiver and not as a transceiver, and block 186 may be implemented as a decoder and not as a CODEC. In these embodiments, the consumer electronic device 180 is capable of receiving and processing the modified user commands 115' from the computer 105.

The controller 188 may be embodied as, for example, a micro-controller, microprocessor, digital signal processor (DSP), Application Specific Integrated Circuit (ASIC), programmable logic device (PLD), field programmable gate array (FPGA), or other suitable devices. The controller 188 permits that consumer electronic device 180 to perform a device operation(s) in response to the modified commands 115'.

The programming environment (which includes, for example, various software shown in FIG. 1 such as the transcoding software code 145, and/or operating system 140 kernel) may be programmed by use of known programming techniques and may be based upon any suitable programming language such as for example, C, C++, JAVA, PASCAL, ADA, COBOL, BASIC, FORTRAN, PERL, PYTHON, or derivatives thereof or other suitable programming languages.

For purposes of describing embodiments of the invention, other known elements in the consumer electronic device 180 have been omitted in FIG. 1.

FIG. 2 is a block diagram of an example remote control device 110A that can be used in an embodiment of the invention. The remote control device 110A has a user interface 165 that includes various buttons, switches, or/and actuators (e.g., buttons 205, 210, and 215) that are selected by the user so that the user can control various entertainment-related functions in the consumer electronic device 180 and/or various entertainment-related functions in the computer 105. Alternatively, the buttons in the user interface 165 may be switches, touch-screen controls, optical controls, infrared controls, and/or the like. The various examples of the buttons, switches, or/and actuators in the user interface 165 are discussed in FIG. 4. It is also noted that the number and types of buttons, switches, or/and actuators in the user interface 165 may vary. Also, different functionalities may be assigned or mapped to different the buttons, switches, or/and actuators in the user interface 165. Therefore, the names used to identify the buttons, switches, or/and actuators in the user interface 165 are shown for example purposes only and are not intended to limit the functionality (or functionalities) that are controlled by the buttons, switches, or/and actuators. The various examples of buttons, switches, or actuators in FIG. 2 are not intended to limit the scope of embodiments of the invention.

The various components of the remote control device 110A may be positioned in different locations for functionality, ergonomics, ease-of-use, and/or other purposes. For example, as shown in FIG. 2, the buttons may be located centrally in the remote control device 110A.

Figure 3:
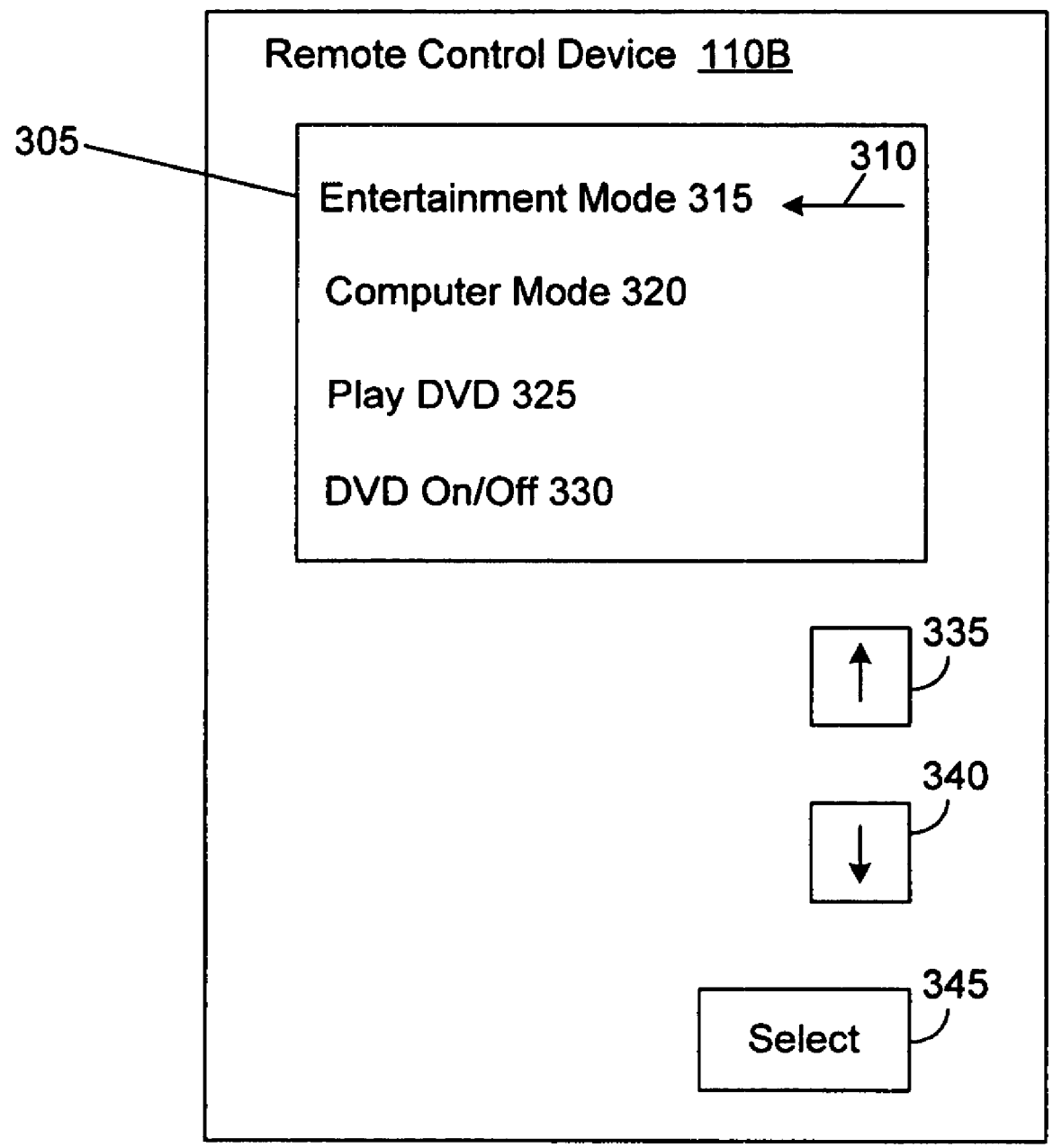
FIG. 3 is a block diagram of another example remote control device that can be used in an embodiment of the invention.
Figure 4:
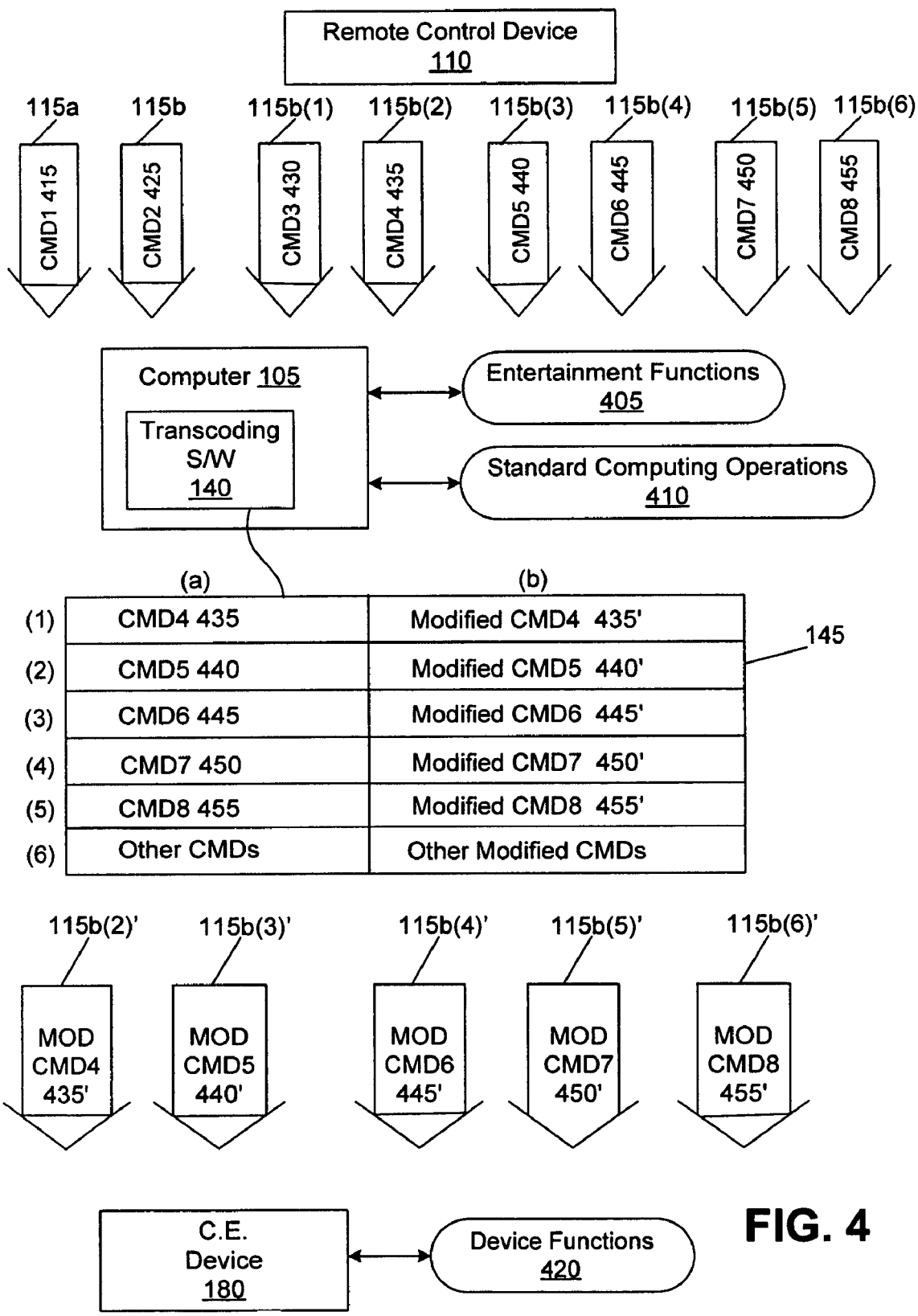
FIG. 4 is a block diagram that illustrates an example operation of the apparatus of FIG. 1, in accordance with an embodiment of the invention.

FIG. 3 is a block diagram of another example remote control device 110B that can be used in an embodiment of the invention. The remote control device 110B includes a display screen 305 that shows various functions that can be controlled by the user. For example, a cursor 310 can be used to select an entertainment mode 315 which permits the remote control device 110B to control the consumer electronic device 180 and/or to control the entertainment-related functions in the computer 105. The cursor 310 can also be used to select a computer mode 320 which permits the computer 105 to perform standard computing operations by use of the operating system 135 (FIG. 1) and/or other software.

A button (or switch or actuator) 335 permits the user to scroll the cursor 315 in an upward direction, while a button (or switch or actuator) 340 permits the user to scroll the cursor 315 in a downward direction. A button (or switch or actuator) 345 permits the user to select a function that is selected by the cursor 310 in the screen 305. It is noted that the cursor 315 is not used in other embodiments of the remote control device 110B. For example, a function (e.g., function 315, 320, 325, or 330) is selected by highlighting the function in the screen 305 by use of various methods that are known to those skilled in the art. As another example, the display 305 may be a touchscreen. As a result, the buttons (or switches or actuators) 335, 340, and 345 are not required in this alternative embodiment of the remote control device 110B.

The various components of the remote control device 110B may be positioned in different locations for functionality, ergonomics, ease-of-use, and/or other purposes.

It is noted that the remote control device 110 can be implemented in various manners or configurations as known to those skilled in the art. Therefore, various examples of the remote control device, as shown in FIG. 2 and FIG. 3, are not intended to limit the scope of embodiments of the invention.

FIG. 4 is a block diagram that illustrates an example operation of the apparatus 100 of FIG. 1, in accordance with an embodiment of the invention. Assume that the user of the remote control device selects or presses the button "C" 210 in FIG. 2, if the user is using the remote control device 110A. The button "C" 210 permits the user to select a computer mode for the apparatus 100. Alternatively, assume that the user selects the computer mode 320 by use of the cursor 310, if the user is using the remote control device 110B in FIG. 3. If the computer mode is selected, then the transmitter 155 (FIG. 1) of the remote control device 110 will transmit a control signal 115a (FIG. 4) to the computer 105. The control signal 115a will include a command code (CMD1 415) that commands the computer 105 to be in the computer mode. The command code CMD1 415 in control signal 115a is encoded by the encoder 160 and is typically in a serial digital format (i.e., serial "1"s and "0"s values). The transceiver 120 receives the control signal 115a and the CODEC 122 determines that the command code CMD1 415 in the control signal 115a will place the computer 105 in the computer mode. In the computer mode, the user can control the standard computing operations 410 of the computer 105 by use of the remote control device 110. Standard computing operations 410 typically involve the use of the operating system software 135 (FIG. 1) and/or multi-tasking functions, as known to those skilled in the art.

As another example, assume that the user of the remote control device selects or presses the button "E" 205 in FIG. 2 if the user is using the remote control device 110A. The button "E" 210 places the computer 105 into the entertainment mode which permits the user to control entertainment-related functions 405 in the computer 105 and/or to control the device functions 420 of the consumer electronic device 180. Alternatively, assume that the user selects the entertainment mode 315 by use of the cursor 310, if the user is using the remote control device 110B in FIG. 3. If the entertainment mode is selected, then the transmitter 155 (FIG. 1) of the remote control device 110 will transmit a control signal 115b to the computer 105. The control signal 115b will include a command code (CMD2 425) that commands the computer 105 to be in the entertainment mode. The command code CMD2 425 in control signal 115b is encoded by the encoder 160 and is typically in a serial digital format (i.e., serial "1"s and "0"s values). The transceiver 120 receives the control signal 115b and the CODEC 122 determines that the command code CMD2 425 in the control signal 115b will place the computer 105 in the entertainment mode.

In the entertainment mode, the user can control the entertainment functions 405 of the computer 105 by use of the remote control device 110. For example, an entertainment function 405 relates to compact disk (CD) operations if the computer 105 has capability to operate a CD. Typically, if the user uses the remote control device 110 to control the entertainment function 405, the use of the operating system 135 and/or multi-tasking features of the computer 105 is not required. As an example, a controller 192 (FIG. 1) in the computer 105 may be used to control the entertainment functions 405 in response to control signals 115 from the remote control device 110 or in response to direct input by the user into the user interface 130 of the computer 105.

As a specific example operation, after the entertainment mode is selected (e.g., by pressing the button 205 or using the cursor 310), the user can use the remote control device 110 to control the entertainment function of playing a CD in the computer 105. The user can press the button 267 in FIG. 2 (or select a selection in the screen 305 to play a CD in the computer 105, if the remote control device 110B is used instead). In response to the user's input into the remote control device 110, the remote control device 110 sends a control signal 115b(1) with a command code (CMD3 430) that will cause the computer 105 to play a CD. The user can cause the computer 105 to perform other entertainment functions such as, for example, turning on or off the music generated by the computer 105 by selecting the button 264, selecting a music broadcast channel in the computer 105 by selecting the button 266, turning a CD player on or off in the computer 105 by selecting the button 268, and/or stopping the playing of a CD in the computer 105 by selecting the button 270. Other entertainment functions 405 in the computer 105 can by controlled by the user by selecting the "other button" 272 or by selecting buttons or selections that are not necessarily shown in the remote control device 110. Therefore, this is an example that describes a method of controlling entertainment functions 405 in the computer 105 by use of the remote control device 110.

The code table 145 is typically a lookup table. As an example, the code table 145 can be provided by a manufacturer of the consumer electronic device 180. The code table 145 can be installed on the computer 105 by, for example, downloading the code table 145 from a website associated with the manufacturer or by using a disk to install the code table 145 to the computer 105.

As another specific example operation, after the entertainment mode is selected, the user can use the remote control device 110 to control the various entertainment functions 420 in the consumer electronic device 180. For example, the user can use the remote control device 110 to play a DVD in the consumer electronic device 180. The user can press the button 215 in FIG. 2 (or select a selection 325 in the screen 305), in order to play a DVD in the consumer electronic device 180. In response to the user's input into the remote control device 110, the remote control device 110 sends a control signal 115b(2) with a command code (CMD4 435) that will command the consumer electronic device 180 to play a DVD. The command CMD4 435 is decoded by the CODEC 122 (FIG. 1). The transcoding software 140 (FIG. 1) will find a match of the command CMD4 in the control signal 115b(2) with a command CMD4 stored in row (1), column (a) of the code table 145. The transcoding software 140 will then modify or translate the command CMD4 into a modified command (MODIFIED CMD4 435') which is in row (1), column (b) of the code table 145. Therefore, each command (CMD) in column (a) of the code table 145 will be mapped to (r associated with) a translated or modified command (MODIFIED CMD) in column (b). Therefore, the code table 145 provides a linking function that links particular buttons (or particular actuators) in the remote control device 110 to particular functions 420 of the consumer electronic device 180. The code table 145 may further include other information about the consumer electronic device 180 to be controlled (depending on the manufacturer). By having the transcoding software 140 perform a code lookup function and code matching function in the code table 145, the transcoding software 140 avoids the necessity of the operating system 135 to perform the translation of the control signal 115 and the interruption of foreground tasks in the computer 105. The code table 145 can be a software that is loaded by a user into the memory 127 of the computer 105 or can be code that is downloaded from a website of a vendor.

The modified command MODIFIED CMD4 435' is a command code that is understandable to the consumer electronic device 180 and that will permit the consumer electronic device 180 to perform a function dictated by the modified command MODIFIED CMD4 435'. Typically, the modified command MODIFIED CMD4 435' is in a serial digital format that is similarly transmitted by a remote control device (not shown in the Figures) that is used for controlling the consumer electronic device 180. As an example and without limitation to the embodiments of the invention, the command CMD4 435 may have the content of, for example, "111000" which is not understood by the consumer electronic device 180 but is understood by the computer 105, while the modified command MODIFIED CMD4 435' may have the content of, for example "111100011" which is understood by the consumer electronic device 180 but is not understood by the computer 105.

After the transcoding software 140 has selected the MODIFIED CMD4 435' as the translation for the command CMD4 435, the MODIFIED CMD4 435' is encoded by the CODEC 122 into a modified control signal 115b(2)'. This modified control signal is then transmitted by the transceiver 120 of computer 105 to the consumer electronic device 180. The receiver (or transceiver) 184 of the consumer electronic device 180 receives the modified control signal 115b(2)' and the CODEC 186 can decode the modified command MODIFIED CMD4 435'. After the MODIFIED CMD4 435' is decoded, the controller 188 can read the MODIFIED CMD4 435' and permit a DVD to be played in accordance with the command dictated by the MODIFIED CMD4 435'.

The user can input other commands into the remote control device 110 to control other device functions 420 in the consumer electronic device 180. For example, the user can turn on or off the DVD function in the consumer electronic device 180 and generate the command CMD5 440 in the control signal 115b(3), by selecting the button 220. The command CMD5 440 is translated into the modified command MODIFIED CMD5 440' in row (2), column (b) of the code table 145, encoded into the modified control signal 115b(3)', and permits the DVD function in the consumer electronic device 180 to be turned on or off.

As another example, the user can stop the playing of a DVD in the consumer electronic device 180 and generate the command CMD6 445 in the control signal 115b(4), by selecting the button 225. The command CMD6 445 is translated into the modified command MODIFIED CMD6 445' in row (3), column (b) of the code table 145, encoded into the modified control signal 115b(4)', and permits the playing of a DVD in the consumer electronic device 180 to be stopped.

As another example, the user can record audio in a DVD in the consumer electronic device 180 and generate the command CMD7 450 in the control signal 115b(5), by selecting the button 230. The command CMD7 450 is translated into the modified command MODIFIED CMD7 450' in row (4), column (b) of the code table 145, encoded into the modified control signal 115b(5)', and permits the recording of audio in a DVD in the consumer electronic device 180.

As another example, the user can pause the playing of a DVD in the consumer electronic device 180 and generate the command CMD8 455 in the control signal 115b(6), by selecting the button 235. The command CMD8 455 is translated into the modified command MODIFIED CMD8 455, in row (4), column (b) of the code table 145, encoded into the modified control signal 115b(6)', and permits the DVD in the consumer electronic device 180 to be paused.

Other commands (CMDs) and corresponding modified commands (MODIFIED CMDs) may be stored in the code table 145, as generally shown in row (6) and columns (a) and (b).

As other examples, the following buttons in the remote control device 110A permit the following functions and generate associated commands CMDs which are then translated into modified commands MODIFIED CMDs. A television (or audio) function in the consumer electronic device 180 can be turned on or off by selecting the button 237. A television broadcast channel in the consumer electronic device 180 can be selected by selecting the button 239. A VCR can play a tape in the consumer electronic device 180 by selecting the button 241. A VCR function in the consumer electronic device 180 can be turned on or off by selecting the button 242. A VCR tape can be stopped in the consumer electronic device 180 by selecting the button 244. A VCR can record a tape in the consumer electronic device 180 by selecting the button 246. A VCR tape can be paused in the consumer electronic device 180 by selecting the button 248. A radio (or stereo or other audio) in the consumer electronic device 180 can be turned on or off by selecting the button 250. A music broadcast channel in the consumer electronic device 180 can be selected by selecting the button 252. A CD player can play a CD in the consumer electronic device 180 by selecting the button 254. A CD function in the consumer electronic device 180 can be turned on or off by selecting the button 256. A CD can be stopped in the consumer electronic device 180 by selecting the button 258. A CD player can record a CD in the consumer electronic device 180 by selecting the button 260. A CD can be paused in the consumer electronic device 180 by selecting the button 262. Other device functions 420 can be controlled in the consumer electronic device 180 by selecting the "other" button 274.

Therefore, the above examples describe methods for controlling entertainment-related functions 420 in the consumer electronic device 180 by use of the remote control device 110.

Figure 5:
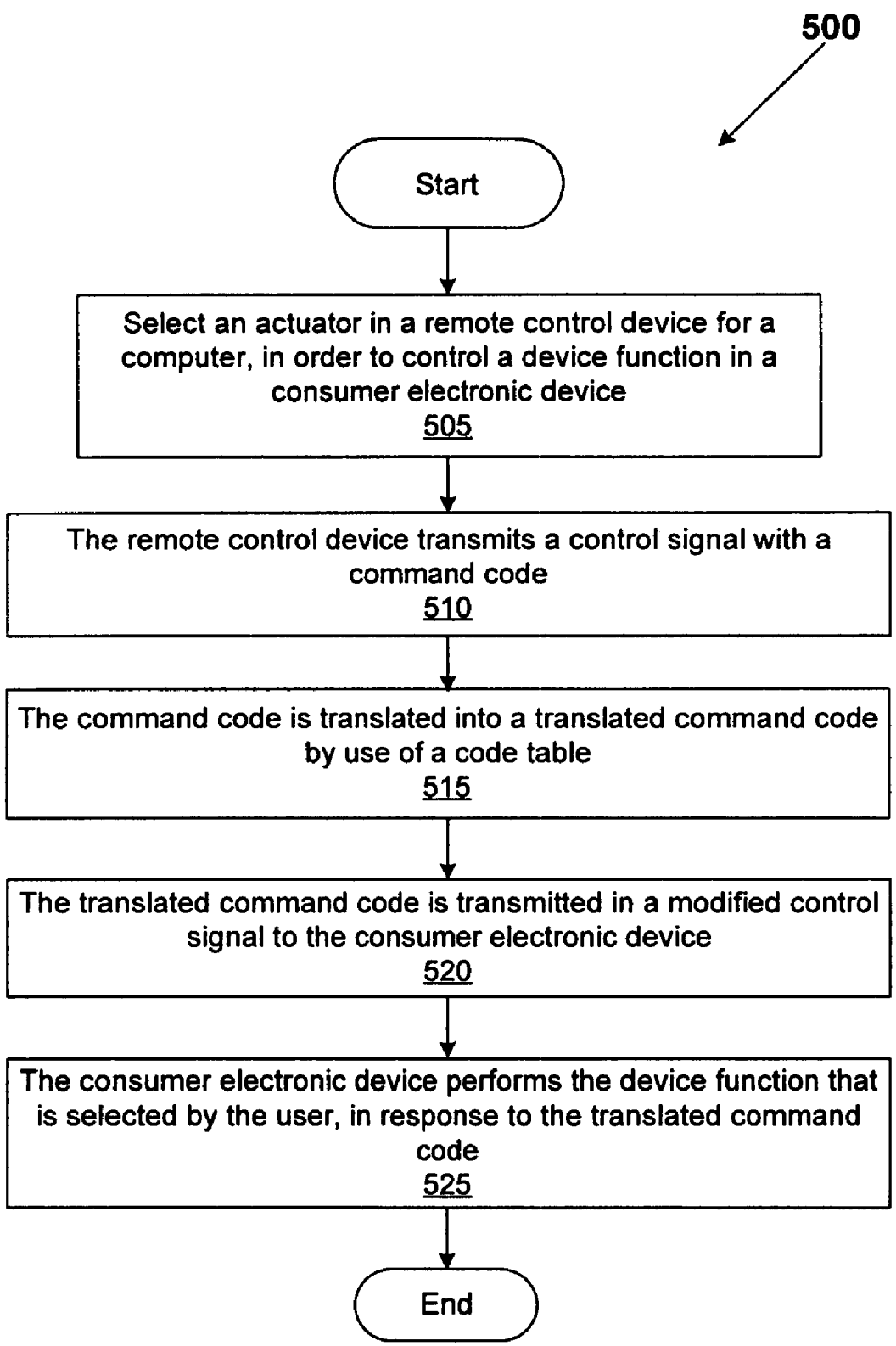
FIG. 5 is a flowchart of a method in accordance with an embodiment of the invention.

FIG. 5 is a flowchart of a method 500 in accordance with an embodiment of the invention. A user first selects (505) an actuator in a remote control device for a computer, in order to control a device function in a consumer electronic device. In response to the user's selection of the actuator, the remote control device transmits (510) a control signal with a command code. The command code in the control signal from the remote control device is translated (515) into a translated command code by use of a code table which is typically stored in a memory in the computer. The translated command code is transmitted (520) in a modified control signal to the consumer electronic device. The translated command code is recognizable to the consumer electronic device. The consumer electronic device performs (525) the device function that is selected by the user, in response to the translated command code.

The various engines or codes discussed herein may be, for example, software, firmware, commands, data files, programs, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for a universal remote control system for controlling home entertainment-related functions and standard computing operations, the apparatus comprising:

a remote control device configured to transmit a first control signal with a first command, a second control signal with a second command, and a third control signal with a third command;

a computer configured to respond to the first command to perform selected ones of the standard computing operations including operations not related to home entertainment functions in a computer mode, respond to the second command to perform a home entertainment-related function of the computer in a first setting of an entertainment mode, translate the third command into a modified command and to transmit the modified command in a modified control signal, in a second setting of the entertainment mode;

wherein in a third setting of the entertainment mode, the computer is configured to perform computing operations, in response to the third command;

wherein the computing operations involve an operating system in the computer in the third setting of the entertainment mode;

wherein, in the second setting of the entertainment mode, the computer translates the third command into the modified command by use of a transcoding software and avoids translation of the third command by the operating system; and a consumer electronic device configured to perform a consumer device function, in response to the modified command.

2. The apparatus of claim 1, wherein the computer comprises:

a code table;

wherein the transcoding software translates the third command into the modified command by use of the code table.

3. The apparatus of claim 1, wherein the consumer device function comprises home entertainment-related function.

4. A method for universal remote control system for controlling home entertainment-related functions and standard computing operations of a computer, the method comprising:

transmitting a first control signal with a first command from a remote control device;

transmitting a second control signal with a second command from the remote control device;

transmitting a third control signal with a third command from the remote control device;

performing selected ones of the standard computing operations including operations not related to home entertainment functions in a computer mode, in response to the first command;

performing a home entertainment-related function of the computer in a first setting of an entertainment mode, in response to the second command;

translating, by the computer, the third command into a modified command and transmitting, by the computer, the modified command in a modified control signal to a consumer electronic device, in a second setting of the entertainment mode;

in a third setting of the entertainment mode setting, performing computing operations, by the computer, in response to the third command;

wherein the computing operations involve an operating system in the computer in the third setting of the entertainment mode;

wherein, in the second setting of the entertainment mode, the computer translates the third command into the modified command by use of a transcoding software and avoids translation of the third command by the operating system; and performing a consumer device function by the consumer electronic device, in response to the modified command.

5. The method of claim 4, wherein the act of translating comprises:

translates the third command into the modified command by use of a code table that is checked by the transcoding software.

6. The method of claim 4, wherein the consumer device function comprises home entertainment-related function.

7. An apparatus for a universal remote control system for controlling home entertainment-related functions and standard computing operations of a computer, the apparatus comprising:

means for transmitting a first control signal with a first command from a remote control device, transmitting a second control signal with a second command from the remote control device, and transmitting a third control signal with a third command from the remote control device;

means for performing selected ones of the standard computing operations including operations not related to home entertainment functions in a computer mode, in response to the first command;

means for performing a home entertainment-related function of the computer in a first setting of the entertainment mode, in response to the second command;

means for translating the third command into a modified command and means for transmitting the modified command in a modified control signal to a consumer electronic device, in a second setting of the entertainment mode;

means for performing computing operations by the computer, in response to the third command, in a third setting of the entertainment mode;

wherein the computing operations involve an operating system in the computer in the third setting of the entertainment mode;

wherein, in the second setting of the entertainment mode, the computer translates the third command into the modified command by use of a transcoding software and avoids translation of the third command by the operating system; and means for performing a consumer device function by the consumer electronic device, in response to the modified command.

8. A physical memory device having stored thereon instructions that when executed by a computer perform the following:

receive a first control signal with a first command from a remote control device;

receive a second control signal with a second command from the remote control device;

receive a third control signal with a third command from the remote control device;

perform standard computing operations of the computer including operations not related to home entertainment functions in a computer mode, in response to the first command;

perform a home entertainment-related function of the computer in a first setting of an entertainment mode, in response to the second command;

translate the third command into a modified command and transmit the modified command in a modified control signal to consumer electronic device, in a second setting of the entertainment mode;

perform computing operations of the computer, in response to the third command, in a third setting of the entertainment mode;

wherein the computing operations involve an operating system in the computer in the third setting of the entertainment mode;

wherein, in the second setting of the entertainment mode, the computer translates the third command into the modified command by use of a transcoding software and avoids translation of the third command by the operating system; and perform a consumer device function by the consumer electronic device, in response to the modified command.

* * * * *